United States Patent
Lightner et al.

(10) Patent No.: US 9,223,875 B2
(45) Date of Patent: Dec. 29, 2015

(54) REAL-TIME DISTRIBUTED IN MEMORY SEARCH ARCHITECTURE

(71) Applicant: QBASE, LLC, Reston, VA (US)

(72) Inventors: Scott Lightner, Leesburg, VA (US); Franz Weckesser, Spring Valley, OH (US)

(73) Assignee: QBASE, LLC, Reston, VA (US)

( * ) Notice: Subject to any disclaimer, the term of this patent is extended or adjusted under 35 U.S.C. 154(b) by 0 days.

(21) Appl. No.: 14/557,827

(22) Filed: Dec. 2, 2014

(65) Prior Publication Data
US 2015/0154297 A1 Jun. 4, 2015

Related U.S. Application Data

(60) Provisional application No. 61/910,850, filed on Dec. 2, 2013.

(51) Int. Cl.
*G06F 17/30* (2006.01)
*G06F 7/00* (2006.01)
*G06F 17/00* (2006.01)

(52) U.S. Cl.
CPC .... *G06F 17/30864* (2013.01); *G06F 17/30283* (2013.01); *G06F 17/30545* (2013.01)

(58) Field of Classification Search
CPC .............. G06F 17/30545; G06F 17/30283
USPC ........................................ 707/770, 674, 686
See application file for complete search history.

(56) References Cited

U.S. PATENT DOCUMENTS

| 6,128,660 | A * | 10/2000 | Grimm et al. ............... 709/227 |
| 6,178,529 | B1 | 1/2001 | Short et al. |
| 6,266,781 | B1 | 7/2001 | Chung et al. |
| 6,353,926 | B1 | 3/2002 | Parthesarathy et al. |
| 6,738,759 | B1 | 5/2004 | Wheeler et al. |
| 6,832,373 | B2 | 12/2004 | O'Neill |
| 7,058,846 | B1 | 6/2006 | Kelkar et al. |
| 7,370,323 | B2 | 5/2008 | Marinelli et al. |

(Continued)

FOREIGN PATENT DOCUMENTS

WO 2013/003770 A2 1/2013

OTHER PUBLICATIONS

International Search Report and Written Opinion dated Mar. 6, 2015 corresponding to International Patent Application No. PCT/US2014/067993, 9 pages.

(Continued)

*Primary Examiner* — Kannan Shanmugasundaram
(74) *Attorney, Agent, or Firm* — Eric L. Sophir; Dentons US LLP

(57) ABSTRACT

Disclosed here are distributed computing system connection configurations having multiple connection bandwidth and latency tiers. Also disclosed are connection configurations including a suitable number of network segments, where network segments may be connected to external servers and clusters including search managers, analytics agents, search conductors, dependency managers, supervisors, and partitioners, amongst others. In one or more embodiments, modules may be connected to the network segments using a desired bandwidth and latency tier. Disclosed here are hardware components suitable for running one or more types of modules on one or more suitable nodes. One or more suitable hardware components included in said clusters include CPUs, Memory, and Hard Disk, amongst others.

10 Claims, 1 Drawing Sheet

(56) References Cited

U.S. PATENT DOCUMENTS

| | | |
|---|---|---|
| 7,421,478 B1 | 9/2008 | Muchow |
| 7,447,940 B2 | 11/2008 | Peddada |
| 7,543,174 B1 | 6/2009 | van Rietschote et al. |
| 7,681,075 B2 | 3/2010 | Havemose et al. |
| 7,818,615 B2 | 10/2010 | Krajewski, III et al. |
| 7,899,871 B1 | 3/2011 | Kumar et al. |
| 8,055,933 B2 | 11/2011 | Jaehde et al. |
| 8,122,026 B1 | 2/2012 | Laroco et al. |
| 8,341,622 B1 | 12/2012 | Eatough |
| 8,345,998 B2 | 1/2013 | Malik et al. |
| 8,356,036 B2 | 1/2013 | Bechtel et al. |
| 8,375,073 B1 | 2/2013 | Jain |
| 8,423,522 B2 | 4/2013 | Lang et al. |
| 8,429,256 B2 | 4/2013 | Vidal et al. |
| 8,726,267 B2 | 5/2014 | Li et al. |
| 8,782,018 B2 | 7/2014 | Shim et al. |
| 8,995,717 B2 | 3/2015 | Cheng et al. |
| 9,009,153 B2 | 4/2015 | Khan et al. |
| 9,025,892 B1 | 5/2015 | Lightner et al. |
| 9,032,387 B1 | 5/2015 | Hill et al. |
| 2001/0037398 A1* | 11/2001 | Chao et al. .................. 709/230 |
| 2002/0165847 A1 | 11/2002 | McCartney et al. |
| 2002/0174138 A1 | 11/2002 | Nakamura et al. |
| 2003/0028869 A1 | 2/2003 | Drake et al. |
| 2003/0112792 A1* | 6/2003 | Cranor et al. ................ 370/352 |
| 2003/0158839 A1* | 8/2003 | Faybishenko et al. ............ 707/3 |
| 2003/0182282 A1 | 9/2003 | Ripley |
| 2004/0027349 A1 | 2/2004 | Landau et al. |
| 2004/0049478 A1 | 3/2004 | Jasper et al. |
| 2004/0143571 A1 | 7/2004 | Bjornson et al. |
| 2004/0153869 A1 | 8/2004 | Marinelli et al. |
| 2004/0205064 A1 | 10/2004 | Zhou et al. |
| 2004/0215755 A1 | 10/2004 | O'Neill |
| 2005/0192994 A1 | 9/2005 | Caldwell et al. |
| 2006/0101081 A1* | 5/2006 | Lin et al. .................. 707/200 |
| 2006/0294071 A1 | 12/2006 | Weare et al. |
| 2007/0005639 A1 | 1/2007 | Gaussier et al. |
| 2007/0203693 A1 | 8/2007 | Estes |
| 2007/0203924 A1 | 8/2007 | Guha et al. |
| 2007/0240152 A1 | 10/2007 | Li et al. |
| 2007/0250519 A1 | 10/2007 | Fineberg et al. |
| 2007/0282959 A1 | 12/2007 | Stern |
| 2008/0010683 A1 | 1/2008 | Baddour et al. |
| 2008/0027920 A1 | 1/2008 | Schipunov et al. |
| 2009/0019013 A1 | 1/2009 | Tareen et al. |
| 2009/0043792 A1 | 2/2009 | Barsness et al. |
| 2009/0049038 A1 | 2/2009 | Gross |
| 2009/0089626 A1 | 4/2009 | Gotch et al. |
| 2009/0094484 A1 | 4/2009 | Son et al. |
| 2009/0240682 A1 | 9/2009 | Balmin et al. |
| 2009/0292660 A1 | 11/2009 | Behal et al. |
| 2009/0299999 A1 | 12/2009 | Loui et al. |
| 2009/0322756 A1 | 12/2009 | Robertson et al. |
| 2010/0077001 A1 | 3/2010 | Vogel et al. |
| 2010/0138931 A1 | 6/2010 | Thorley et al. |
| 2010/0223264 A1 | 9/2010 | Bruckner et al. |
| 2010/0235311 A1 | 9/2010 | Cao et al. |
| 2010/0274785 A1 | 10/2010 | Procopiuc et al. |
| 2011/0071975 A1 | 3/2011 | Friedlander et al. |
| 2011/0093471 A1 | 4/2011 | Brockway et al. |
| 2011/0119243 A1 | 5/2011 | Diamond et al. |
| 2011/0125764 A1 | 5/2011 | Carmel et al. |
| 2011/0282888 A1 | 11/2011 | Koperski et al. |
| 2011/0296397 A1 | 12/2011 | Vidal et al. |
| 2012/0030220 A1 | 2/2012 | Edwards et al. |
| 2012/0059839 A1 | 3/2012 | Andrade et al. |
| 2012/0102121 A1 | 4/2012 | Wu et al. |
| 2012/0117069 A1 | 5/2012 | Kawanishi et al. |
| 2012/0131139 A1 | 5/2012 | Siripurapu et al. |
| 2012/0246154 A1 | 9/2012 | Duan et al. |
| 2012/0310934 A1 | 12/2012 | Peh et al. |
| 2012/0323839 A1 | 12/2012 | Kiciman et al. |
| 2013/0132405 A1 | 5/2013 | Bestgen et al. |
| 2013/0166480 A1 | 6/2013 | Popescu et al. |
| 2013/0166547 A1 | 6/2013 | Pasumarthi et al. |
| 2013/0290232 A1 | 10/2013 | Tsytsarau et al. |
| 2013/0303198 A1 | 11/2013 | Sadasivam et al. |
| 2014/0013233 A1 | 1/2014 | Ahlberg et al. |
| 2014/0022100 A1 | 1/2014 | Fallon et al. |
| 2014/0156634 A1 | 6/2014 | Buchmann et al. |
| 2014/0244550 A1 | 8/2014 | Jin et al. |
| 2014/0280183 A1 | 9/2014 | Brown et al. |
| 2014/0351233 A1 | 11/2014 | Crupi et al. |
| 2015/0074037 A1 | 3/2015 | Sarferaz |
| 2015/0154079 A1 | 6/2015 | Lightner et al. |
| 2015/0154264 A1 | 6/2015 | Lightner et al. |
| 2015/0154297 A1 | 6/2015 | Lightner et al. |

OTHER PUBLICATIONS

International Search Report and Written Opinion of the International Searching Authority dated Mar. 3, 2015 corresponding to International Patent Application No. PCT/US2014/067921, 10 pages.

International Search Report and Written Opinion of the International Searching Authority dated Apr. 15, 2015 corresponding to International Patent Application No. PCT/US2014/068002, 10 pages.

International Search Report and Written Opinion dated Mar. 10, 2015 corresponding to International Patent Application No. PCT/US2014/067999, 10 pages.

Tunkelang, D., "Faceted Search," Morgan & Claypool Publ., 2009, pp. i-79.

Schuth, A., et al., "University of Amsterdam Data Centric Ad Hoc and Faceted Search Runs," ISLA, 2012, pp. 155-160.

Tools, Search Query Suggestions using ElasticSearch via Shingle Filter and Facets, Nov. 2012, pp. 1-12.

International Search Report and Written Opinion dated Feb. 24, 2015 corresponding to International Patent Application No. PCT/US2014/067918, 10 pages.

* cited by examiner

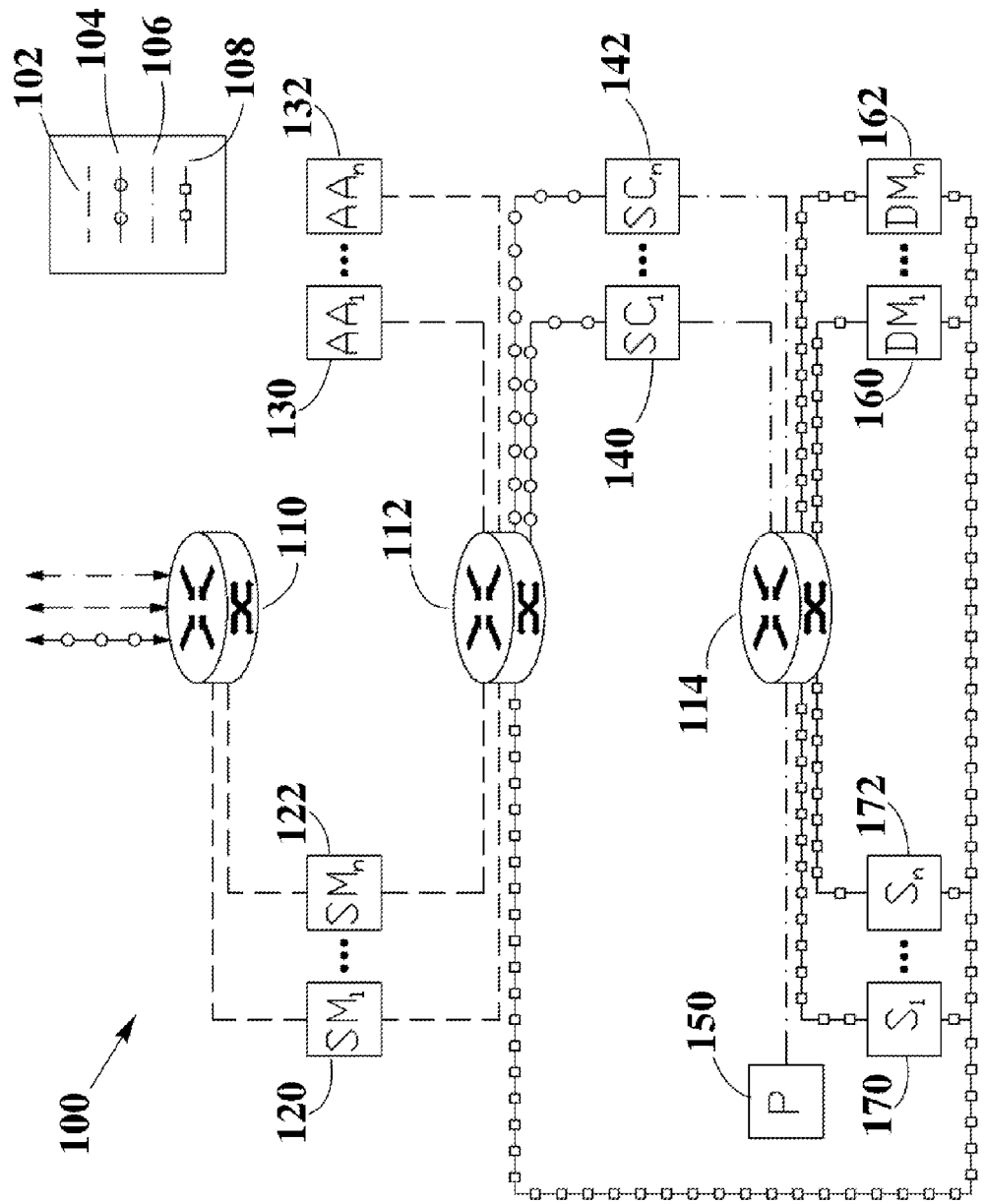

REAL-TIME DISTRIBUTED IN MEMORY SEARCH ARCHITECTURE

CROSS-REFERENCE TO RELATED APPLICATIONS

This application claims the benefit of U.S. Provisional Application No. 61/910,850, entitled "REAL-TIME DISTRIBUTED IN MEMORY SEARCH ARCHITECTURE," filed on Dec. 2, 2013, which is hereby incorporated by reference in its entirety.

This application is related to U.S. patent application Ser. No. 14/557,794, entitled "Method for Disambiguating Features in Unstructured Text," filed Dec. 2, 2014; U.S. patent application Ser. No. 14/558,300, entitled "Event Detection Through Text Analysis Using Trained Event Template Models," filed Dec. 2, 2014; U.S. patent application Ser. No. 14/557,807, entitled "Method for Facet Searching and Search Suggestions," filed Dec. 2, 2014; U.S. patent application Ser. No. 14/558,254, entitled "Design and Implementation of Clustered In-Memory Database," filed Dec. 2, 2014; U.S. patent application Ser. No. 14/557,951, entitled "Fault Tolerant Architecture for Distributed Computing Systems," filed Dec. 2, 2014; U.S. patent application Ser. No. 14/558,009, entitled "Dependency Manager for Databases," filed Dec. 2, 2014; U.S. patent application Ser. No. 14/558,055, entitled "Pluggable Architecture for Embedding Analytics in Clustered In-Memory Databases," filed Dec. 2, 2014; U.S. patent application Ser. No. 14/558,101 "Non-Exclusionary Search Within In-Memory Databases," filed Dec. 2, 2014; and U.S. patent application Ser. No. 14/557,900, entitled "Data record compression with progressive and/or selective decompression," filed Dec. 2, 2014; each of which are incorporated herein by reference in their entirety.

TECHNICAL FIELD

The present disclosure relates in general to in-memory databases, and more specifically to hardware configurations of use in in-memory databases.

BACKGROUND

Computers are powerful tools of use in storing and providing access to vast amounts of information, while databases are a common mechanism for storing information on computer systems while providing easy access to users. Typically, a database is an organized collection of information stored as "records" having "fields" of information. (e.g., a restaurant database may have a record for each restaurant in a region, where each record contains fields describing characteristics of the restaurant, such as name, address, type of cuisine, and the like).

In operation, a database management system frequently needs to retrieve data from or persist data to storage devices such as disks. Unfortunately, access to such storage devices can be somewhat slow. To speed up access to data, databases typically employ a "cache" or "buffer cache" which is a section of relatively faster memory (e.g., random access memory (RAM)) allocated to store recently used data objects. Memory is typically provided on semiconductor or other electrical storage media and is coupled to a CPU (central processing unit) via a fast data bus which enables data maintained in memory to be accessed more rapidly than data stored on disks.

One approach that may be taken when attempting to solve this problem is to store all the information in the database in memory, however as memory provided on computer systems has a limited size there are a number of obstacles that must be faced when attempting to handle databases of a larger scale. Some of these obstacles may include determining the technologies required to operate the database, including the networking needed, the hardware required for different nodes, and others.

As such, there is a continuing need for improved methods of storing and retrieving data at high speeds at a large scale.

SUMMARY

Disclosed herein are connection configurations for nodes of a system hosting an in-memory database, the nodes having multiple connection bandwidth and latency tiers, where a first bandwidth tier may be associated with a bandwidth higher than a second bandwidth tier, the second bandwidth tier may be associated with a bandwidth higher than a third bandwidth tier, the third bandwidth tier may be associated with a bandwidth higher than a fourth bandwidth tier, and the first latency tier may be associated with a latency lower than the second latency tier.

Disclosed herein is a distributed-computing system having multiple network segments, each with bandwidth and latency tiers applied to the distributed in-memory data platform. The system includes connection configurations having a suitable number of network segments, where network segments may be connected to a number of servers internal and external to the system, and to clusters of servers in the system. The servers of the system may include software modules such as search managers, analytics agents, search conductors, dependency managers, supervisors, and partitioners, amongst others. Servers and modules may be connected to the desired network segments to achieve desired bandwidth and latency needs. Servers and modules may be connected to the desired network segments to separate different classes of network traffic, to prevent one class of traffic from interfering with another.

In one embodiment, a system comprising one or more nodes hosting an in-memory database, the system comprises a plurality of storage nodes comprising non-transitory machine-readable storage medium storing one or more partitions of a collection, wherein the collection stored by each respective storage node contains one or more records of a database, and wherein the storage medium of each respective storage node comprises main memory; a search manager node comprising a processor generating one or more search conductor queries using a search query received from a user node, transmitting the one or more search conductor queries to one or more search conductor nodes according to the search query, and forward one or more sets of search results to one or more analytics agent nodes according to the search query responsive to receive the one or more sets of search results; an analytics agent node comprising a processor executing one or more analytics algorithms responsive to receiving a set of search results from the search manager node; a search conductor node comprising a processor querying the collection of the database records of a storage node according to a search conductor query in response to receiving the search conductor query from the search manager, and transmitting the set of one or more search results to the search manager node in response to identifying the one or more search results of the set, wherein each respective search result corresponds to a database record containing data satisfying the search conductor query; and a plurality of network segments comprising one or more connections between one or more nodes communicating over each respective network segment, wherein a first network segment comprises the search manager, the search conductor, and the analytics agent.

Numerous other aspects, features and benefits of the present disclosure may be made apparent from the following detailed description taken together with the drawing FIG-URES.

BRIEF DESCRIPTION OF THE DRAWINGS

The present disclosure can be better understood by referring to the following FIGURES. The components in the FIGURES are not necessarily to scale, emphasis instead being placed upon illustrating the principles of the disclosure. In the FIGURES, reference numerals designate corresponding parts throughout the different views.

FIG. 1 is a connection diagram for a computing system hosting an in-memory database system, in which the nodes are logically clustered.

DEFINITIONS

As used herein, the following terms have the following definitions:

"Node" refers to a computer hardware configuration suitable for running one or more modules.

"Cluster" refers to a set of one or more nodes.

"Module" refers to a computer software component suitable for carrying out one or more defined tasks.

"Collection" refers to a discrete set of records.

"Record" refers to one or more pieces of information that may be handled as a unit.

"Field" refers to one data element within a record.

"Partition" refers to an arbitrarily delimited portion of records of a collection.

"Search Manager", or "S.M.", refers to a module configured to at least receive one or more queries and return one or more search results.

"Analytics Agent", "Analytics Module", "A.A.", or "A.M.", refers to a module configured to at least receive one or more records, process said one or more records, and return the resulting one or more processed records.

"Search Conductor", or "S.C.", refers to a module configured to at least run one or more queries on a partition and return the search results to one or more search managers.

"Node Manager", or "N.M.", refers to a module configured to at least perform one or more commands on a node and communicate with one or more supervisors.

"Supervisor" refers to a module configured to at least communicate with one or more components of a system and determine one or more statuses.

"Heartbeat", or "HB", refers to a signal communicating at least one or more statuses to one or more supervisors.

"Partitioner" refers to a module configured to at least divide one or more collections into one or more partitions.

"Dependency Manager", or "D.M.", refers to a module configured to at least include one or more dependency trees associated with one or more modules, partitions, or suitable combinations, in a system; to at least receive a request for information relating to any one or more suitable portions of said one or more dependency trees; and to at least return one or more configurations derived from said portions.

"Database" refers to any system including any combination of clusters and modules suitable for storing one or more collections and suitable to process one or more queries.

"Query" refers to a request to retrieve information from one or more suitable databases.

"Memory" refers to any hardware component suitable for storing information and retrieving said information at a sufficiently high speed.

"Fragment" refers to separating records into smaller records until a desired level of granularity is achieved.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The present disclosure describes hardware configurations that may be implemented in distributed computing systems hosting an in-memory database, sometimes referred to as "in-memory database architectures."

An in-memory database is a database storing data in records controlled by a database management system (DBMS) configured to store data records in a device's main memory, as opposed to conventional databases and DBMS modules that store data in "disk" memory. Conventional disk storage requires processors (CPUs) to execute read and write commands to a device's hard disk, thus requiring CPUs to execute instructions to locate (i.e., seek) and retrieve the memory location for the data, before performing some type of operation with the data at that memory location. In-memory database systems access data that is placed into main memory, and then addressed accordingly, thereby mitigating the number of instructions performed by the CPUs and eliminating the seek time associated with CPUs seeking data on hard disk.

In-memory databases may be implemented in a distributed computing architecture, which may be a computing system comprising one or more nodes configured to aggregate the nodes' respective resources (e.g., memory, disks, processors). As disclosed herein, embodiments of a computing system hosting an in-memory database may distribute and store data records of the database among one or more nodes. In some embodiments, these nodes are formed into "clusters" of nodes. In some embodiments, these clusters of nodes store portions, or "collections," of database information.

In one or more embodiments, suitable connection configurations may include a suitable number of network segments, where network segments may be connected to external servers, a first cluster including one or more search managers, a second cluster including one or more analytics agents, a third cluster including one or more search conductors, a fourth cluster including one or more dependency managers, a fifth cluster including one or more supervisors, and a sixth cluster including one or more partitioners. In one or more embodiments, modules may be connected to the network segments using a desired bandwidth and latency tier.

In one or more embodiments of the present disclosure, nodes of use in the first, second, third, fourth, fifth, and sixth cluster, as well as nodes, may include hardware components suitable for running one or more types of modules. One or more suitable hardware components included in said clusters include CPUs, Memory, and Hard Disk, amongst others.

In one or more embodiments, the number of nodes used in a system hosting an in-memory database may be sufficiently high so as to allow the system hosting the in-memory database to operate at a desired capacity with a desired rate of growth, where the number of nodes in the system may allow the system to grow for a lead time required to acquire hardware.

In one or more embodiments, configurations disclosed here may reduce costs associated with deploying one or more suitable in-memory databases.

System Connections

FIG. 1 show Connection Diagram 100 having Line Type A 102, Line Type B 104, Line Type C 106, Line type D 108, First Network Segment 110, Second Network Segment 112, Third Network Segment 114, First Search Manager 120, nth Search Manager 122, First Analytics Agent 130, nth Analytics Agent 132, First Search Conductor 140, nth Search Conductor 142, Partitioner 150, First Dependency Manager 160, nth Dependency Manager 162, First Supervisor 170, and nth Supervisor 172.

In one or more embodiments, Line Type A 102 may represent a connection having a first bandwidth tier and a first latency tier, Line Type B 104 may represent a connection having a second bandwidth tier and the first latency tier, Line Type C 106 may represent a connection having a third bandwidth tier and a second latency tier, and Line Type D 108 may represent a connection having the fourth bandwidth tier and the second latency tier. In one or more embodiments the first bandwidth tier may be associated with a bandwidth higher than the second bandwidth tier, the second bandwidth tier may be associated with a bandwidth higher than the third bandwidth tier, the third bandwidth tier may be associated with a bandwidth higher than the fourth bandwidth tier, and the first latency tier may be associated with a latency lower than the second latency tier.

First Network Segment

In one or more embodiments, a First Network Segment 110 may be connected to external servers using any suitable connection, including Line Type A 102, Line Type B 104, and Line Type C 106. First Network Segment 110 may also be connected to a first cluster including a First Search Manager 120 and up to an nth Search Manager 122 using a Line Type A 102 connection.

Second Network Segment

In one or more embodiments, a Second Network Segment 112 may be connected to the first cluster including First Search Manager 120 and up to nth Search Manager 122 using a Line Type A 102 connection. Second Network Segment 112 may also be connected to a second cluster including a First Analytics Agent 130 and up to an nth Analytics Agent 132 a Line Type A 102 connection, a third cluster including a First Search Conductor 140 up to an nth Search Conductor 142 using a Line Type B 104 connection, a fourth cluster including a First Dependency Manager 160 up to nth Dependency Manager 162 using a Line Type D 108 connection, and a fifth cluster including a First Supervisor 170 up to nth Supervisor 172 using a Line Type D 108 connection.

In one or more embodiments, the bandwidth tier of Line Type A 102 may be sufficient for ensuring the first cluster including First Search Manager 120 and up to nth Search Manager 122 is able to at least receive an appropriate amount of information from a suitable number of search conductors in the third cluster including First Search Conductor 140 up to an nth Search Conductor 142. The latency tier of Line Type A 102 may be sufficiently low so as to at least allow the system to be responsive enough to carry out a desired number of queries.

In one or more embodiments, the bandwidth tier of Line Type B 104 may be sufficient for ensuring search conductors in the third cluster including First Search Conductor 140 up to an nth Search Conductor 142 are able to at least return a desired size of results. The latency tier of Line Type B 104 may be sufficiently low so as to at least allow the system to be responsive enough to carry out a desired number of queries.

In one or more embodiments, the bandwidth tier of Line Type D 108 may be sufficient for ensuring dependency managers in the fourth cluster including First Dependency Manager 160 up to nth Dependency Manager 162 are able to at least receive a desired number of package requests and return a desired number of packagers. Additionally, the bandwidth tier of Line Type D 108 may be sufficient for ensuring supervisors in the fifth cluster including First Supervisor 170 up to nth Supervisor 172 are able to at least monitor and manage a desired number of nodes and modules. The latency tier of Line Type D 108 may be sufficiently low so as to at least allow the system to be managed in a desired period of time and to provide a desired monitoring frequency.

Third Network Segment

In one or more embodiments, a Third Network Segment 114 may be connected to the third cluster including a First Search Conductor 140 up to an nth Search Conductor 142 using a Line Type C 106 connection, the fourth cluster including a First Dependency Manager 160 up to nth Dependency Manager 162 using a Line Type D 108 connection, the fifth cluster including a First Supervisor 170 up to nth Supervisor 172 using a Line Type D 108 connection, and a sixth cluster including one or more Partitioners 150 using a Line Type C 106 connection.

In one or more embodiments, the bandwidth tier of Line Type B 104 may be sufficient for ensuring one or more Partitioners 150 are able to at least access a desired collection and output a desired number of partitions within a desired period of time. Additionally, the bandwidth tier of Line Type B 104 may be sufficient for ensuring the first cluster including First Search Manager 120 and up to nth Search Manager 122 is able to at least load a desired number of partitions within a desired period of time. The latency tier of Line Type B 104 may be sufficiently low so as to at least allow nodes using the connection to react to system commands within a desired period of time, and to allow the system to provide a desired monitoring frequency.

In one or more embodiments, the bandwidth tier of Line Type D 108 may be sufficient for ensuring dependency managers in the fourth cluster including First Dependency Manager 160 up to nth Dependency Manager 162 are able to at least receive a desired number of package requests and return a desired number of packagers. Additionally, the bandwidth tier of Line Type D 108 may be sufficient for ensuring supervisors in the fifth cluster including First Supervisor 170 up to nth Supervisor 172 are able to at least monitor and manage a desired number of nodes and modules. The latency tier of Line Type D 108 may be sufficiently low so as to allow the system to be managed in a desired period of time and to provide a desired monitoring frequency.

In one or more embodiments, the fifth cluster including First Supervisor 170 up to nth Supervisor 172 may have a Line Type D 108 connection to one or more node managers in any suitable number of nodes.

In one or more other embodiments, additional clusters including one or more other types of modules may be connected to First Network Segment 110, Second Network Segment 112, and/or Third Network Segment 114, where the connections may include Line Type A 102, Line Type B 104, Line Type C 106, and/or Line type D 108 connections.

System Hardware

In one or more embodiments of the present disclosure, nodes of use in the first, second, third, fourth, fifth, and sixth cluster, as well as nodes of use in other clusters not shown in FIG. 1, may include hardware components suitable for running one or more types of modules.

CPU Capacity

In one or more embodiments, nodes including a suitable number of Search Managers may require a CPU of a sufficiently high computation capacity so as to execute queries on an in-memory database within a desired period of time.

In one or more embodiments, nodes including a suitable number of Analytics Agents may require a CPU of a sufficiently high computation capacity so as to allow the system to process one or more desired analytics within a desired period of time. In one or more embodiments, CPUs of use in nodes including said one or more Analytics Agents may be of a higher capacity than those used in nodes including a suitable number of Search Managers.

In one or more embodiments, nodes including a suitable number of Search Conductors may require a CPU of a sufficiently high computation capacity so as to allow the search conductors to execute search queries on the associated partition within a desired period of time, where the CPU capacity may be sufficient so as to achieve a desired level of idleness.

In one or more embodiments, nodes including a suitable number of Partitioners may require a CPU of a sufficiently high computation capacity so as to partition one or more desired collections within a desired period of time. In one or more embodiments, the CPU may be of a sufficiently high computation capacity so as to allow partitioned data to be indexed and/or compressed within a desired period of time.

Memory Capacity

In one or more embodiments, nodes including a suitable number of Search Managers may require a memory capacity sufficiently high so as to execute queries on an in-memory database within a desired period of time, where the amount of memory may be sufficient to collate results from a suitable number of search conductors for a desired number of queries.

In one or more embodiments, nodes including a suitable number of Analytics Agents may require a require a memory capacity sufficiently high so as to allow the system to process one or more desired analytics within a desired period of time. In one or more embodiments, memory capacities of use in nodes including said one or more Analytics Agents may be of a higher capacity than those used in nodes including a suitable number of Search Managers.

In one or more embodiments, nodes including a suitable number of Search Conductors may require memory capacity sufficiently high so as to allow the search conductors to load a desired amount of information into memory. In one or more embodiments, the amount of memory required per search conductor may be proportional to:

$$\frac{\text{Compressed size of all collection} * \text{desired level of redundancy} * \text{desired failover capacity}}{\text{desired number of search conductors}}$$

Where the amount of memory required per search conductor may not exceed the amount of memory that may be installed on the associated node. In one or more embodiments, the amount of memory per node may also be adjusted according to the complexity of the queries to be executed by the search conductor. More complex queries may cause a load on the node's CPU sufficiently high so as to reduce the effectiveness of having a larger memory capacity. Less complex queries may cause a load on the node's CPU sufficiently light so as to allow a higher memory capacity to be used effectively.

In one or more embodiments, nodes including a suitable number of Partitioners may require a memory capacity sufficiently high so as to partition one or more desired collections within a desired period of time. In one or more embodiments, the memory capacity may be of a sufficiently high capacity so as to allow partitioned data to be indexed and/or compressed within a desired period of time.

Hard Disk

In one or more embodiments, nodes including a suitable number of Partitioners may require a hard disk of a speed sufficient to allow the Partitioners to process the data in within a desired period of time.

Growth Rate

In one or more embodiments, the number of nodes used in a system hosting an in-memory database may be sufficiently high so as to allow the system hosting the in-memory database to operate at a desired capacity with a desired rate of growth, where the number of nodes in the system may allow the system to grow for a lead time required to acquire hardware.

Example #1 is a system hosting an in-memory database with connections set up in a manner similar to that described in FIG. 1. Search Managers, Search Conductors and Analytics Agents are all directly participating in the flow of an interactive user query. To minimize the latency of the user query, these modules are connected with the lowest latency connections. Search Managers and Analytics Agents work with the larger aggregated answer sets and benefit from the greatest bandwidth, where as the Search Conductors deal with the hundreds of partition based answer set components which require less bandwidth. Partitioners deal with large data volumes but at non-interactive speeds so they have both moderate latency and moderate bandwidth connections. Supervisors and Dependency managers are non-interactive and low data volume and so require lowest bandwidth and the highest latency connections. This configuration attempts to minimize cost based on actual need.

Therefore, in this example, Line Type A is an InfiniBand connection with a 40 Gb bandwidth and a latency of 1 microsecond or less; Line Type B is an InfiniBand connection with a 20 Gb bandwidth and a latency of 1 microsecond or less; Line Type C is a 10 Gb Ethernet connection; and Line Type D is a 100 Mb Ethernet connection. In this example, nodes including a search manager include CPUs able to operate at 2 Teraflops; nodes including a search conductor include CPUs able to operate at 4 Teraflops; nodes including an analytics agent include CPUs able to operate at 4 Teraflops; and nodes including a partitioner include CPUs able to operate at 6 Teraflops. In this example, nodes including a search conductor include 32 to 64 GB of RAM, nodes including an analytics agent include 32 to 64 GB of RAM, and 6 nodes including a partitioner each include 64 GB of RAM and a 10,000 RPM hard disk.

Example #2 is a system hosting in-memory database with connections set up in a manner similar to that described in FIG. 1. Search Managers, Search Conductors and Analytics Agents are all directly participating in the flow of interactive user queries and data inserts. To separate high-volume, back-end data insert network traffic from interactive, low-latency user queries, modules are connected using different network tiers. This configuration allows for responsive, interactive user queries by utilizing a low-latency network tier, such as InfiniBand, while also allowing high-volume data inserts utilizing a separate high-bandwidth network tier. Both types of operations run optimally without interfering with each other.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A system comprising one or more nodes hosting an in-memory database, the system comprising:
a plurality of storage nodes comprising non-transitory machine-readable storage medium storing one or more partitions of a collection, wherein the collection stored by each respective storage node contains one or more records of a database, and wherein the storage medium of each respective storage node comprises main memory;
one or more partitioner nodes partitioning one or more collections of database records and distributing the one or more collections to the one or more storage nodes according to a schema file responsive to receiving the one or more collections;
a search manager node comprising a processor generating one or more search conductor queries using a search query received from a user node, transmitting the one or more search conductor queries to one or more search conductor nodes according to the search query, and forward one or more sets of search results to one or more analytics agent nodes according to the search query responsive to receive the one or more sets of search results;
an analytics agent node comprising a processor executing one or more analytics algorithms responsive to receiving a set of search results from the search manager node;
a search conductor node comprising a processor querying the collection of the database records of a storage node according to a search conductor query in response to receiving the search conductor query from the search manager, and transmitting the set of one or more search results to the search manager node in response to identifying the one or more search results of the set, wherein each respective search result corresponds to a database record containing data satisfying the search conductor query;
a plurality of network segments comprising one or more connections between one or more nodes communicating over each respective network segment, wherein a first network segment comprises the search manager, the search conductor, and the analytics agent;
a dependency manager comprising non-transitory machine-readable storage medium storing one or more configuration package files and a dependency tree, wherein the one or more configuration package files attempts to minimize cost based on actual need, and a processor configured to determine a configuration package file for a failed node and transmit the configuration package file to a supervisor node based on the dependency tree in response to a request for the configuration package file from the supervisor node; wherein a third network segment further comprises the one or more connections communicating the request for the configuration package file; and the one or more supervisor nodes comprising the processor continuously monitoring one or more statuses associated with the one or more nodes of the system, and configured to transmit the configuration package file to the failed node of the one or more nodes in response to receiving a status indicating a failed resource of the failed node.

2. The system according to claim 1,
wherein each respective network segment comprises the one or more connections based upon a resource demand associated with a communication type, and
wherein the communications type is selected from the group consisting of search query data, one or more collections of database records, status data, and configuration package files.

3. The system according to claim 2, wherein the resource demand of each respective communication type is determined according to a latency demand and a bandwidth demand, wherein the latency demand is based on a permissible amount of time for the communication, and wherein the bandwidth demand is based on an amount of data for the communication.

4. The system according to claim 2, wherein the first network segment comprises the one or more connections communicating search query data.

5. The system according to claim 4, wherein the first network segment comprises a physical connection using InfiniBand.

6. The system according to claim 4, wherein a second network segment comprises the one or more connections communicating the one or more collections from each respective partitioner to the one or more storage nodes.

7. The system according to claim 6, wherein the second network segment comprises a second physical connection using InfiniBand.

8. The system according to claim 7, wherein the second network segment comprises a second physical connection using Ethernet.

9. The system according to claim 6, wherein a the third network segment comprises the one or more connections communicating each respective status of each respective node to the one or more supervisor nodes and the configuration package file transmitted from the supervisor node to the failed node.

10. The system according to claim 9, wherein the third network segment comprises a third physical connection using Ethernet.

* * * * *